(12) United States Patent
Snyder

(10) Patent No.: US 9,370,778 B2
(45) Date of Patent: Jun. 21, 2016

(54) EGGSHELL MEMBRANE SEPARATION PROCESS

(71) Applicant: K & S Investments, L.P., Minburn, IA (US)

(72) Inventor: Terry Snyder, Minburn, IA (US)

(73) Assignee: K & S Investments, L.P., Minburn, IA (US)

( * ) Notice: Subject to any disclaimer, the term of this patent is extended or adjusted under 35 U.S.C. 154(b) by 336 days.

(21) Appl. No.: 13/899,120

(22) Filed: May 21, 2013

(65) Prior Publication Data

US 2014/0346261 A1    Nov. 27, 2014

(51) Int. Cl.
| | | |
|---|---|---|
| *B02C 19/00* | (2006.01) | |
| *A23L 1/32* | (2006.01) | |
| *A47J 43/14* | (2006.01) | |
| *B03B 9/06* | (2006.01) | |
| *A23L 1/305* | (2006.01) | |
| *A23L 1/30* | (2006.01) | |

(52) U.S. Cl.
CPC .................. *B02C 19/005* (2013.01); *A23L 1/30* (2013.01); *A23L 1/305* (2013.01); *A23L 1/32* (2013.01); *A47J 43/145* (2013.01); *B03B 9/061* (2013.01); *Y02W 30/521* (2015.05)

(58) Field of Classification Search
CPC ...... B02C 19/00; B02C 19/005; B02C 23/08; A23L 1/305; A23L 1/30; A23L 1/32; B03B 9/061; A47J 43/145; Y02W 30/521
USPC ....................................................... 241/30, 5
See application file for complete search history.

(56) References Cited

U.S. PATENT DOCUMENTS

| | | |
|---|---|---|
| 498,488 A | 5/1893 | Power |
| 2,169,684 A | 8/1939 | Erickson |
| 2,258,537 A | 10/1941 | Calkins |
| 2,440,927 A | 5/1948 | Boss at al |
| 2,535,980 A | 12/1950 | Yeamans |

(Continued)

FOREIGN PATENT DOCUMENTS

| | | |
|---|---|---|
| JP | 59-49878 | 3/1984 |
| JP | 60-259160 | 12/1985 |

(Continued)

OTHER PUBLICATIONS

Gentle Roll Cleaner/Sifter by EBM Manufacturing, Inc; http://www.gentleroll.com, Dec. 2013.

*Primary Examiner* — Mark Rosenbaum
(74) *Attorney, Agent, or Firm* — Brick Gentry PC; Brian J. Laurenzo; Jessica L. Susie

(57) ABSTRACT

A method is provided to separate an eggshell membrane from the outer shell of an egg. The method includes first adjusting the moisture content of an eggshell which includes a shell and a membrane. The eggshell is then subjected to airflow, such that the shell is broken and detaches from the membrane resulting in shell particles and membrane fragments. The shell particles and membrane fragments may be further dried and separated. The membrane fragments may then be processed. In some embodiments, the moisture content is adjusted to less than 24% such as by drying the eggshell. The eggshell may be pulverized resulting in shell powder or dust. The membrane fragments may be further processed for storage, transport, or the final application of same, such as by drying, grinding, and/or freezing.

18 Claims, 6 Drawing Sheets

(56) References Cited

U.S. PATENT DOCUMENTS

| | | |
|---|---|---|
| 2,548,812 A | 4/1951 | Patterson |
| 3,552,458 A | 1/1971 | Whitman |
| 3,761,026 A | 9/1973 | Rohmer |
| 3,774,525 A | 11/1973 | Driggs |
| 4,082,856 A | 4/1978 | Zwiep et al. |
| 4,308,290 A | 12/1981 | Fujii |
| 4,396,158 A | 8/1983 | Olsen |
| 4,631,837 A | 12/1986 | Magoon |
| 4,730,790 A | 3/1988 | Williams |
| 5,215,267 A | 6/1993 | Taylor |
| 5,350,147 A | 9/1994 | Paganus |
| 5,480,037 A | 1/1996 | Pope |
| 5,722,594 A | 3/1998 | Farr et al. |
| 6,270,050 B1 | 8/2001 | Friedrich |
| 6,491,242 B1 | 12/2002 | Dingee, IV et al. |
| 6,588,686 B2 | 7/2003 | Dingee, IV et al. |
| 6,588,688 B1 | 7/2003 | Rossler |
| 6,649,203 B1 | 11/2003 | Thoroski |
| 6,722,594 B2 | 4/2004 | Graham |
| 6,840,487 B2 | 1/2005 | Carnevali |
| 6,899,294 B2 | 5/2005 | MacNeil |
| 6,946,551 B2 | 9/2005 | Long et al. |
| 6,962,311 B1 | 11/2005 | Sykes |
| 6,966,533 B1 | 11/2005 | Kalis et al. |
| 6,978,953 B2 | 12/2005 | Graham |
| 7,040,557 B2 | 5/2006 | Graham et al. |
| 7,059,550 B2 | 6/2006 | Graham et al. |
| 7,109,300 B2 | 9/2006 | Losso et al. |
| 7,137,580 B2 | 11/2006 | Graham et al. |
| 7,374,113 B2 | 5/2008 | Graham et al. |
| 7,429,008 B2 | 9/2008 | Graham et al. |
| 7,500,830 B2 | 3/2009 | Graham et al. |
| 7,584,909 B2 | 9/2009 | Vlad |
| 7,600,733 B2 | 10/2009 | Burnett-Evans et al. |
| 7,868,165 B2 | 1/2011 | Patel-Framroze |
| 7,909,577 B2 | 3/2011 | Graham et al. |
| 7,992,831 B2 | 8/2011 | Fan |
| 8,006,406 B2 | 8/2011 | Dingee, IV |
| 8,080,272 B2 | 12/2011 | Strohbehn et al. |
| 8,133,521 B2 | 3/2012 | Strohbehn et al. |
| 8,173,174 B2 | 5/2012 | Strohbehn et al. |
| 8,197,852 B2 | 6/2012 | Strohbehn et al. |
| 8,197,853 B2 | 6/2012 | Strohbehn et al. |
| 8,211,477 B2 | 7/2012 | Strohbehn et al. |
| 8,344,106 B1 | 1/2013 | Summers et al. |
| 8,418,943 B2 | 4/2013 | DeJong et al. |
| 8,470,975 B2 | 6/2013 | Summers et al. |
| 2007/0178170 A1 | 8/2007 | DeVore et al. |
| 2008/0234195 A1 | 9/2008 | Long et al. |
| 2011/0272502 A1 | 11/2011 | New |
| 2012/0060724 A1 | 3/2012 | Doss et al. |
| 2013/0035474 A1 | 2/2013 | Summers et al. |
| 2013/0079496 A1 | 3/2013 | Summers et al. |
| 2013/0137854 A1 | 5/2013 | den Hoed |
| 2013/0217631 A1 | 8/2013 | den Hoed |

FOREIGN PATENT DOCUMENTS

| | | |
|---|---|---|
| JP | 3-45264 | 2/1991 |
| JP | 8-173838 | 10/1994 |
| WO | WO98/41326 | 3/1998 |
| WO | WO2012/013144 | 7/2011 |
| WO | WO2013/020060 | 8/2012 |

EGGSHELL MEMBRANE SEPARATION PROCESS

FIELD OF THE INVENTION

The present invention relates to methods of processing of eggshells. More specifically, the present invention relates to methods of separating and processing an eggshell membrane from an outer egg shell, and processing the resulting shell and membrane components to achieve high quality membrane and shell, which may be used as valuable end products.

BACKGROUND

Eggs, such as those laid and commonly gathered from chickens, include a number of nutritionally valuable components. Typical consumers are familiar with nutrients found in the yolk and egg white (also called the albumen); however, the egg shell and eggshell membrane are also sources of valuable nutrients. The shell contains calcium carbonate, while the membrane is composed of proteins. Upon separation, the shell and the membrane may be used for human food supplements, animal feed supplements, and pharmaceutical purposes. For example, eggshell powder, which is rich in calcium, may be used for both human and animal nutritional supplements. The membrane may be used as a source of collagen, hyaluronic acid, and amino acids. Among other uses, collagen and hyaluronic acid may both be used in the biomedical and cosmetics industries. Moreover, amino acids may be used for animal and human nutrition as well as for cosmetic purposes.

Moreover, the egg shell and eggshell membrane are available as raw product from both processed fertilized and unfertilized eggs that are processed for other purposes. In many cases the eggshell, including the shell and membrane, are treated as waste. Most often, unfertilized eggs are used in foods, while fertilized eggs are hatched to grow chickens. However, in some cases fertilized eggs are not chosen for hatching and enter the market as a food source. As is known in the art, a chick grows from the yolk of an egg, while the egg white remains to provide a food source for the growing chick. Once the eggs have been processed, such as in a food processing or hatching facility, some amount of egg white remains on the eggshells and provides a source of moisture that affects downstream processing.

Although egg shells and eggshell membranes present many valuable uses and are readily available, their value is rarely realized. One primary reason for this is because effective separation of the eggshell and eggshell membrane has historically been met with frustration. One cause for this frustration has been difficulty determining both the optimum moisture content of the eggshell raw product and when in an eggshell membrane separation process drying should occur if necessary. Ascertaining the optimum moisture content is important to an eggshell membrane separation process for a number of reasons. First, eggshell raw product oftentimes contains pathogens from the hatchery facility or other source wherein egg breaking occurs. Oftentimes, pathogens thrive in environments with increased moisture. Accordingly, moisture removal can be beneficial in killing pathogens and preventing same in a finished product.

Next, increased moisture can lead to problems in the separation process. For example, in many processes the egg shell is reduced to a powder or a dust. Excess moisture can mix with the egg shell powder and lead to clogging in the machinery used for separation. On the other hand, too little moisture is also a problem, as the eggshell membrane requires some moisture to stay intact. Accordingly, too little moisture may lead to deterioration of the eggshell membrane during separation. Furthermore, if the moisture content is too low, the membrane may stick to the outer shell, which prevents separation of the two components. Other factors affecting moisture content include temperature and humidity. Accordingly, there exists a need in the art for a process to separate an egg shell from an eggshell membrane that includes the appropriate moisture level of the eggshell raw product. Moreover, the process should optimize the stage at which moisture level adjustment occurs.

Some previous methods of eggshell processing and membrane separation are known. For example, U.S. Pat. No. 6,649,203 to Thoroski discloses methods and an apparatus for processing eggshells. The methods disclosed therein include embodiments wherein egg shell and membrane are both processed together and separated for individual purposes. In the method to separate the shell and membrane, the raw product is initially centrifuged to remove residual liquid. The raw product is then washed and centrifuged to remove the wash liquid. Next, the eggshells are dried via heat and tumbled to bring about separation of the shell and membrane. Specifically, the eggshells are heated to 88 degrees Celsius for two minutes to reduce the moisture content to 1-3%. The heat from the drying process breaks protein attachments connecting the shell and membrane and, therefore, effects separation of same. Tumbling action accomplishes further separation.

The products are separated a first time by sieving, which removes large pieces of membrane and leaves behind small pieces of membrane and the shell pieces. The remaining small membrane and shell pieces are then delivered to a hammer mill for further size reduction. The shell and membrane pieces are then separated based on their relative densities, with the membrane pieces removed by a pneumatic removal system while the shell pieces collect in bottom of the hammer mill housing. The above-described process is inefficient in that it requires multiple drying steps before detaching the eggshell membrane from the eggshell. Additionally, steps beyond drying, namely a washing step, must be used to effectively remove pathogens. In an alternate embodiment, the eggshell raw product may be centrifuged, washed, and dried as described above. The eggshells are then processed and separated in the hammer mill without further processing.

U.S. Pat. No. 6,649,203 further describes processes wherein egg shell and eggshell membrane may be processed together for future uses. In one such process, the egg shell and membrane are placed in a rotary drum dryer to remove excess water and pasteurize the eggshells. After drying, the eggshells are processed in a hammer mill, which reduces the eggshells to a powder. The powder includes both the egg shell and the eggshell membrane and may be used for chicken feed. The process fails to separate the shell and membrane to be used for their individual value added purposes.

Processes such as those disclosed in the above-described U.S. Pat. No. 6,649,203 which include a hammer mill are not well suited for separating egg shell and membrane. As is known in the art, a hammer mill includes a number of hammers which are mounted onto a rotating shaft or drum. As the shaft or drum rotates, the hammers collide with material that has been fed into the hammer mill. In addition to the hard outer shell, a hammer mill will also reduce the eggshell membrane to smaller pieces. Accordingly, separation is difficult or impossible. Therefore, membrane yield is less when using a hammer mill than when using other types of grinders, such as ultrasonic grinders or devices that employ airflow.

For example, in a process described in United States Patent Application Publication No. 2011/0272502 to New, which is hereby incorporated by reference, a system and process for separating eggshell membranes utilizing airflow is disclosed. The system pushes the airflow through a venturi to pulverize the unprocessed eggshells, which separates the outer shell from the membrane. Flow of the air through the venturi creates pressure changes, which may create one or more shockwaves, resulting in pulverization of the brittle outer shell of the eggshell. The reference anticipates that the membranes will be left intact. Accordingly, the pulverized outer shell and membranes may be separated by means such as a cyclone separator or shaker screen with the appropriate mesh size. However, the system and process disclosed in United States Patent Application Publication No. 2011/0272502 presents difficulties that have not previously been overcome. Namely, the machinery, especially the devices creating the airflow and through which the airflow passes, often clogs with material. In addition, the airflow can also pulverize the membrane, preventing effective separation of the outer shell and the membrane.

Accordingly, there is a need in the art for an improved process for separating eggshells and eggshell membranes so that the value of each may be realized. Such a process should prevent both the machinery from clogging with material and the membrane from being pulverized. Such a process should adjust the starting material to the optimum moisture content, which in some embodiments may be accomplished by drying the eggshell raw product for a particular time and in a particular sequence. Said process will preferably allow for commercial scale processing of eggshell raw product and be capable of continuous operation. Moreover, an improved process will preferably kill pathogens present on the eggshell raw product.

SUMMARY

The present invention provides a method for separating an egg shell and eggshell membrane, which may be carried out in a commercial scale, continuous embodiment. A method of the present invention provides the optimum moisture content of eggshell raw product, which is obtained by adjusting the moisture content of the eggshell raw product, which includes the shell and membrane, at the beginning of the separation process. In many embodiments, this adjustment will include an initial drying step. An initial drying step may kill pathogens present on the eggshell raw product. A method of the present invention may comprise adjusting the moisture content of an eggshell that includes a shell and a membrane. The eggshell may then be broken such that the shell detaches from the membrane, resulting in shell particles and membrane fragments. This may be completed by subjecting the eggshell to airflow, which breaks the shell such that the shell detaches from the membrane. The shell particles and membrane fragments may be further dried and separated. If desired, the membrane fragments may be processed, such as by drying, freezing, and/or grinding.

In some embodiments, the method may include drying the eggshell to a moisture content of less than 24% by weight. In some embodiments, the moisture content may be 6% to 24% or 10% to 24% by weight. The drying of the eggshell may occur in a dryer at a temperature of 48-77 degrees Celsius, and in some embodiments the drying may occur at 60 degrees Celsius. The drying may occur for about 60 to 90 minutes. Moreover, the step of breaking the shell such that it detaches from the eggshell membrane may occur in a pulverizer. In some embodiments the pulverizer may operate at 3500-3750 revolutions per minute. Moreover, after pulverization, the shell particles may be less than 50 microns in size, which may be smaller in size than the membrane fragments. The shell particles and membrane fragments may then be separated based on the relative sizes and/or densities thereof.

In another embodiment of the present invention, the method may comprise drying an eggshell including a shell and a membrane, such as to a moisture content of less than 24% by weight. Further, the eggshell may be broken such that the shell detaches from the membrane, resulting in shell particles and membrane fragments. This step may occur by subjecting the eggshell to airflow, which causes detachment of the shell from the membrane by breaking the shell. The shell particles may be smaller in size than the membrane fragments, and both may be further dried. The shell particles and membrane fragments may then be separated based on the relative sizes and/or densities of the two substances. The membrane fragments may be further processed, such as by drying. In some embodiments, the drying of the eggshell including the shell and the membrane may occur at a temperature of 48-77 degrees Celsius for about 60-90 minutes. Moreover, the breaking of the shell may be by pulverization, with the resulting shell particles being less than 50 microns.

In yet another embodiment of the present invention, a method may comprise drying an eggshell including a shell and a membrane to a moisture content of less than 24% by weight. The drying may be accomplished at a temperature of 48-77 degrees Celsius. The eggshell may then be pulverized such that the eggshell detaches from the membrane, resulting in shell particles and membrane fragments. This step may occur by subjecting the eggshell to airflow. The airflow breaks the shell such that the shell detaches from the membrane. The shell particles may be less than 50 microns and smaller in size than the membrane fragments. After pulverization the shell particles and membrane fragments may be further dried and then separated based on the relative sizes thereof. The separated membrane fragments may have a moisture content of 3% to 5% by weight. The membrane fragments may then be processed, such as by drying, freezing, and/or grinding.

DETAILED DESCRIPTION

The following is a detailed description of embodiments of an eggshell membrane separation process. For ease of discussion and understanding, methods 100, 112, 124 consistent with the process may be described with respect to certain machinery. However, it will be understood by one skilled in the art that the steps of the disclosed methods 100, 112, 124 may be carried out by machinery or processes other than those specifically disclosed herein to obtain a similar or identical result. Accordingly, the following detailed description and associated figures should not be read as limiting.

Figure 1:
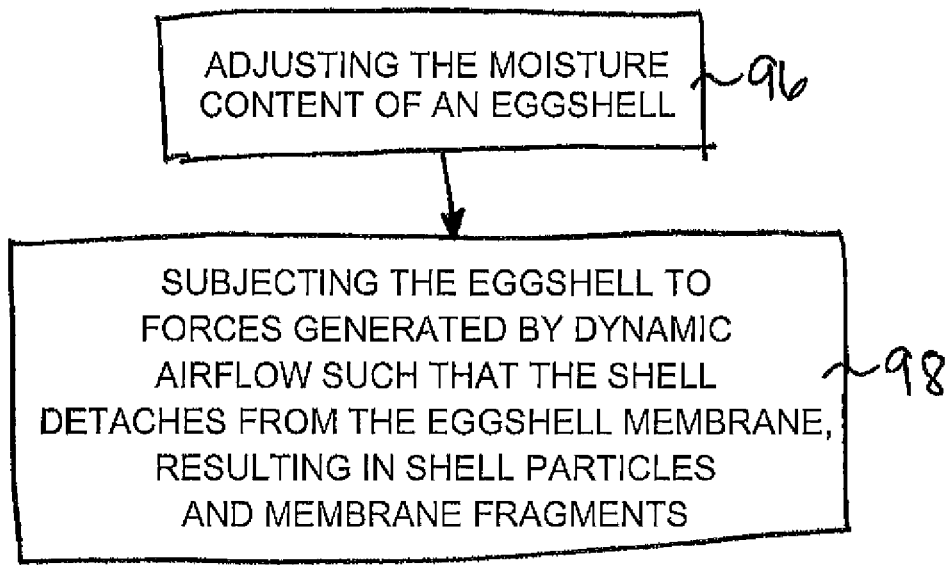
FIG. 1 is a flow chart of an exemplary eggshell membrane separation process according to one or more embodiments of the present invention.
Figure 2:
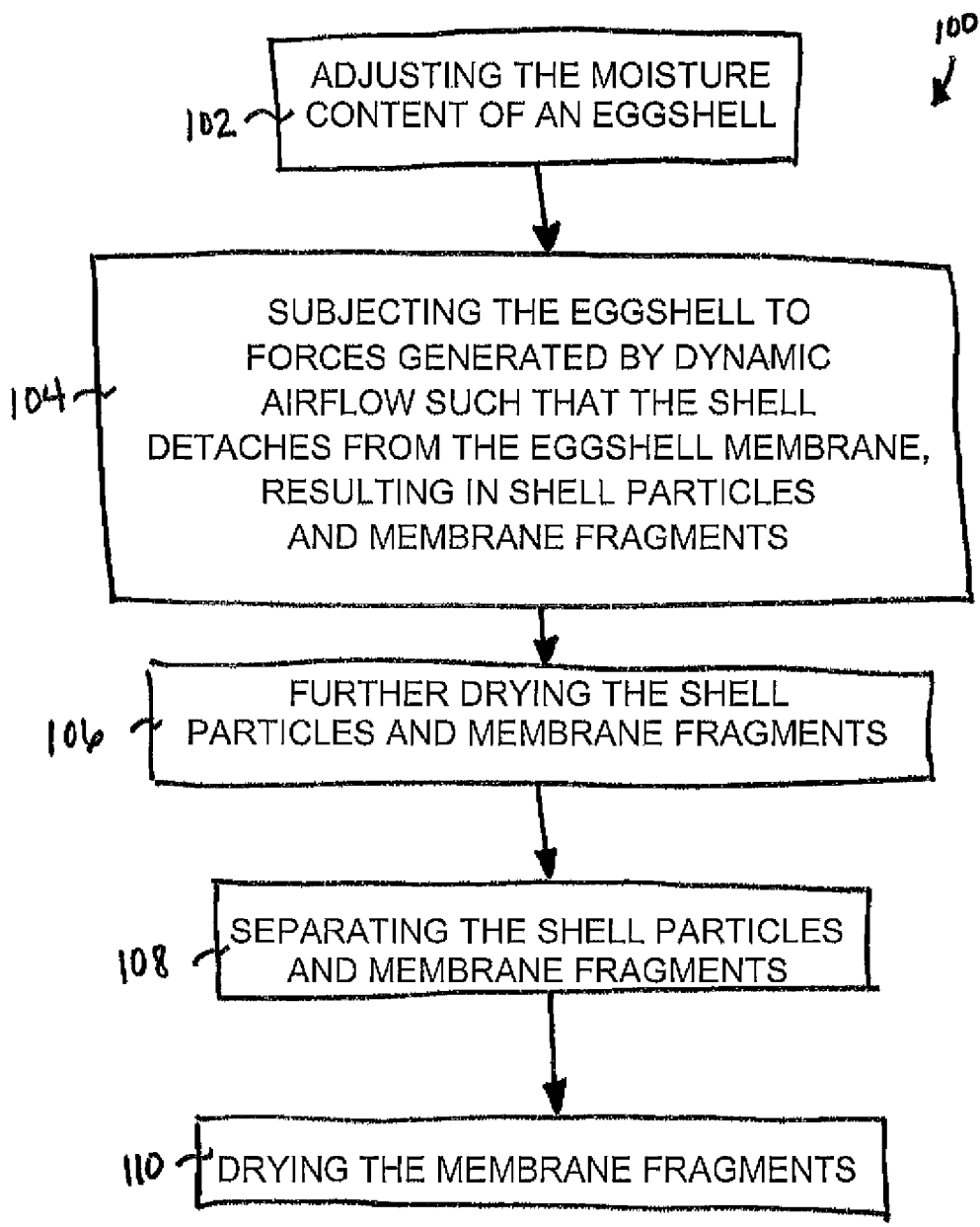
FIG. 2 is a flow chart of a first eggshell membrane separation process according to a first embodiment of a method of the present invention.

A method of an eggshell membrane separation process is provided. With reference to FIG. 1, the method includes adjusting the moisture content of an eggshell, which includes a shell and a membrane, as shown in block 96, and subjecting the eggshell to forces generated by introducing dynamic airflow, which is shown in block 98. The forces may include, but are not limited to, impacts, vibrations, centrifugal force, turbulent force, laminar stress, and combinations thereof. The airflow and forces generated therefrom break the shell such that it detaches from the membrane, resulting in shell particles and membrane fragments. The eggshells used in the described method are sometimes processed before leaving the facility disposing of or further processing the eggshells. For example, the facility may centrifuge or press the eggshells. Referring to FIG. 2, an exemplary method 100 of an eggshell membrane separation process is shown. As provided in block 102, the method begins by adjusting the moisture content of an eggshell. The eggshell is then broken to produce shell particles and membrane fragments, as provided by block 104. More specifically, this step may occur by subjecting the eggshell to airflow, which breaks the shell such that the shell detaches from the membrane, resulting in shell particles and membrane fragments. Next, the shell particles and membrane fragments are further dried, which is illustrated in block 106, and separated, which is shown in block 108. The membrane fragments are then dried, as provided by block 110.

Referring again to block 102, the method begins by adjusting the moisture content of an eggshell. In many embodiments, the adjustment will include drying the eggshell. As discussed above, many eggshells contain residual albumen or egg white from the egg breaking facility. Moreover, the environmental conditions, such as temperature and humidity, may affect the moisture content of the eggshells, such as outdoor conditions and/or processing facility conditions. In one example, eggshells may begin with about 52% moisture by weight. Moisture content may be measured by any method known in the art. In one example, an Ohaus MB45 Moisture Analyzer may be used to determine moisture content of the starting eggshells, final products, and intermediates. In practice, the method 100 will likely be carried out in a continuous, commercial-scale fashion. Accordingly, many eggshells will be subjected to the process at one time. In one embodiment, eggshells may be pulverized at a rate greater than 1 ton per hour. In one example, 1-4 tons of eggshells are processed per hour, although 100 tons per hour or more may be processed. The amount of egg shell and membrane products recovered are dependent on the moisture content of the eggshells, including the shell and membrane, after the initial adjustment step shown in block 102. The initial adjustment step 102 may take place in a variety of ways. By way of example only, the initial adjustment 102 may take place in a dryer tumbler, a drum dryer, or by using steam heat. It is anticipated that other means for adjusting the moisture content of the eggshells will also be effective. Commercially available drum dryers include those manufactured by Heil, Blue Diamond, Zhenqzho Dngli, Taramac Industries, and Kaysons.

Obtaining the preferable moisture content of the eggshell raw product prior to breaking the shell and membrane for detachment and separation from each other assists in effective separation of the egg shell from the eggshell membrane. Preferably the eggshell raw product will have less than 15% moisture by weight after the initial adjustment step. More preferably the eggshell raw product will have 6% to 24% moisture, such as 10% to 24% moisture and most preferably 20% to 24% moisture. Adjusting the moisture level to less than 24% has the advantage of preventing shell particles from sticking together and clogging the airflow and separation equipment, but includes enough moisture to keep the eggshell membrane intact, such that the shell particles separate cleanly from the membrane without destroying the membrane. In addition to assisting in separation of the shell from the membrane, the initial drying step also has the advantage of killing pathogens that may be present on the eggshell raw product. Various factors must be considered when determining how long and at what temperature to dry the eggshell raw product. The amount of eggshell raw product that may be dried at a given time may be limited by the weight that the dryer can hold. Moreover, the weight of the eggshell raw product may be dependent on the moisture level of same prior to the initial adjustment step 102. Accordingly, the initial moisture level is a factor to be considered when determining the rate of eggshell processing. Moreover, the ambient temperature and humidity may affect the drying time.

In the preferred embodiment, the initial drying step occurs at a temperature of 48-77 degrees Celsius (120-170 degrees Fahrenheit). More preferably the initial drying step occurs at a temperature of 60 degrees Celsius (140 degrees Fahrenheit). As will be apparent to one skilled in the art, a warmer dryer will oftentimes require less drying time to reach the appropriate moisture level, while a cooler dryer will oftentimes require more drying time to reach the appropriate moisture level. In one example, the raw eggshell product entering the dryer includes approximately 18% moisture by weight. The eggshells are dried in a drum dryer for 60 minutes at 48-60 degrees Celsius (120-140 degrees Fahrenheit) for 60 minutes. The eggshells exiting the drum dryer will have approximately 6% to 24% moisture, such as 10% moisture. In another example, the eggshell raw product may be dried in the drum dryer for forty-five to sixty minutes at 71 to 82 degrees Celsius (160-180 degrees Fahrenheit). The eggshells exiting the drum dryer will have approximately 14% to 16% moisture. In the preferred embodiment, the eggshells exiting the dryer may have a temperature of 68 to 74 degrees Celsius (155-165 degrees Fahrenheit), and more preferably 68 degrees. In one embodiment, the eggshells are held at 68 degrees Celsius for ten minutes after reaching same. As is known in the art, the angle of a drum dryer may be adjusted to manipulate the rate at which its contents dry. In the preferred embodiment of the eggshell membrane separation processes discussed herein, the drum is kept in a level or nearly level position.

Usually the eggshell membrane will retain more moisture than the shell. Accordingly, after drying the shell is oftentimes drier than the membrane. As will be discussed hereinbelow, this moisture disparity is advantageous to downstream steps of the process. Oftentimes, a visual and/or touch examination of the dried eggshell product will allow a user to discern whether the appropriate moisture level has been reached. The shell should be crunchy, but the membrane must remain tough. Preferably the shell will exhibit a light crunch, while the membrane will not exhibit any crunch. The membrane will generally be pink and pliable at this point. A moisture content of 6% to 24% moisture by weight, and preferably 20% to 24%, will provide these properties. As will be discussed herein below, and is illustrated by block 104 of FIG. 2, after moisture level adjustment 102, the eggshell will be broken. Preferably the membrane will retain enough moisture to allow it to exit the breaking step in fragments larger than the shell particles also produced during breaking.

Next, as shown by block 104 in FIG. 2, the eggshells containing the optimum moisture content are subjected to forces generated by an airflow. The airflow breaks the shell such that it detaches from the membrane, resulting in shell particles and membrane fragments. In one embodiment, the dried eggshells are subjected to a pulverizing apparatus, including but not limited to an ultrasonic grinder or a device that utilizes airflow to reduce the size of its contents. Optionally, the pulverizing apparatus may also remove more moisture. For example, in one embodiment, the eggshells may include 1% to 2% less moisture by weight after processing by the pulverizing apparatus. Ultrasonic grinders and devices utilizing airflow to reduce the size of contents are known. For example, U.S. Pat. No. 6,722,594, incorporated herein by reference, and related patents and applications to Graham disclose a pulverizer and method of pulverizing. The disclosed pulverizer utilizes air flow at speeds of Mach 1 or higher to dry and reduce the size of frangible materials, such as to a powder. The airflow is pushed through a venturi. Similarly, United States Patent Application Publication No. 2011/0272502, discussed in detail above and incorporated herein by reference, discloses such a device.

In the above-identified devices, the airflow pulls material through the device, including the venturi. Movement of the air through the venturi causes acceleration of both the air and the contents of the machine. This acceleration results in stretching of the contents of the machine—the eggshell including the shell and membrane. As discussed above, the moisture adjustment step causes the hard outer shell to become drier than the membrane. Accordingly, the outer shell, which is primarily composed of hard calcium, breaks or shatters. The membrane, containing more moisture, is elastic, pliable, and stretchy. Accordingly, the hard outer shell breaks loose from the membrane. However, as discussed above, the moisture content of the eggshells is important. If the eggshells are too dry, the membrane loses its elasticity and is pulverized along with the shell. On the other hand, if the eggshells are too moist, the shell may not effectively be pulverized and/or the dust or powder resulting from pulverization may be so moist that it clogs the machinery used in the method, including but not limited to the device creating the airflow.

Other devices utilizing air flow, including or excluding a venturi may be utilized. In another example, DevourX brand pulverizing machinery may be used to break or pulverize the dried eggshells. DevourX machinery similarly uses air flow to pulverize and/or dry material. Specifically, the machinery replicates a tornado or cyclone to simultaneously reduce particle size and moisture content of raw product without mechanical action. It is anticipated that in some embodiments, pulverizers made of stainless steel may be preferred, as the use of stainless steel will aid in limiting bacteria present in the process. However, as one of skill in the art will appreciate, pulverizers composed of any material may be used without departing from the scope of the invention.

In yet another example, U.S. Pat. Nos. 6,491,242 and 6,588,686 both to Dingee, IV et al., and incorporated herein by reference, disclose an apparatus and method, respectively, directed to malleable material reduction and drying of the malleable material. Material is fed into an air stream in the malleable material reduction apparatus, and the speed of the air flow is increased so that it is supercyclonic. Material to material collisions in one or more cyclone shaped vessels cause the material to be reduced in size. Although similar to the Graham patent, the Dingee, IV et al. patents differ with respect to placement of components including the venturi and blower fans. By way of another example, centrifugal force may be used to break the eggshell such that the shell cracks and detaches from the membrane. A centrifuge or other device employing centrifugal force may be used for this purpose. In the preferred embodiment, a pulverizing machine may be run at 3500-3750 revolutions per minute and most preferably at 3750 revolutions per minute. In some embodiments, the step of subjecting the eggshell to airflow will also dry the eggshells slightly, such as by causing a 1% to 2% reduction in moisture content. Additionally, in some embodiments, the device used in this step may generate heat, although it is not necessary.

The breaking step results in shell particles and membrane fragments. Preferably, the shell particles may be a powder or dust less than 50 microns. The membrane fragments may be any size sufficiently large enough to allow the shell particles and membrane fragments to be separated by a sifter or similar device based on the relative sizes and/or densities thereof. In the preferred embodiment, the membrane fragments may be greater than 5 mm. There is no maximum preferred size of the membrane fragments, although sizes nearing or above 1 cm are advantageous. In some embodiments, the size of the membrane fragments is not reduced during this step. In most cases, the products obtained from this step will consist of approximately 95% shell particles (or calcium) and 5% eggshell membrane.

As shown by block 106 in FIG. 2, the shell particles and membrane fragments are further dried. In one embodiment, the membrane fragments include 3% to 5% moisture by weight after the combined further drying and separation steps, as described herein below. Further drying of the eggshell membrane allows the living water to be removed. Living water facilitates bacterial and other pathogenic growth. In addition, further drying of the membrane fragments stabilizes same. Accordingly, this step prepares the eggshell membrane for collection, storage, and future use. In the preferred embodiment, the further drying is carried out in a Russell Finex® brand vibratory screener, which sifts the particles and fragments. Specifically, a 48 inch drum may be used. Sifter screens would be sized appropriately for the membrane and shell sizes being utilized. In one example, an 18 US mesh screen that allows sub 1000 micron egg shell calcium to fall away from the membrane may be used. The sifting has the consequence of both drying and separating the shell particles and membrane fragments simultaneously. In another embodiment the further drying is carried out in a Gentle Roll™ sifter. As is known in the art, a Gentle Roll™ sifter sifts and screens material, effecting separation of different types of material based on size and/or density. The Gentle Roll™ sifter utilizes a rotary drum enclosed in a screen to effect separation. In yet another embodiment, a Sweco stainless steel scalper/screener may be used, such as a 48 inch diameter screener. As one skilled in the art will appreciate, the disclosed processes may be scaled as appropriate to employ machinery of differing sizes. Moreover, additional machinery, including but not limited to multiple screeners, may be used. An advantage to embodiments utilizing screeners is that heat is not required to further dry the shell particles and membrane fragments.

As provided above, in the preferred embodiment the further drying takes place simultaneously with separation of the shell particles and membrane fragments, which is shown in block 108 of FIG. 2. It is anticipated that other types and brands of dryers and/or sifters known in the art now or in the future may be utilized to carry out the further drying and separating steps. Moreover, the two steps need not occur simultaneously. However, in the preferred embodiment, the Russell Finex® vibratory screener operates to further dry and separate the shell particles and membrane fragments.

Once the egg shell and eggshell membrane have been separated, the two products may be either separately processed, processed together, or a combination of the two. In the preferred embodiment, after exiting the sifter, the egg shell particles, which are mainly composed of calcium, are collected. Processing of egg shell particles may be complete at this point or may continue with further steps as the application so requires. As discussed above, egg shell may be used as a calcium source in numerous applications, such as animal and human food or in pharmaceutical applications.

The eggshell membrane fragments may be further processed at the separation facility. As shown in block 110 of FIG. 2, the eggshell membrane fragments may be dried. In addition, the membrane fragments may be frozen and/or ground. A drying step may be carried out in any type of drying apparatus, such as those described above. Moreover, the drying step may result in membrane fragments or ground membrane powder having 2% to 4% moisture by weight. In the preferred embodiment, the eggshell membrane drying is combined with further reduction in size of the membrane fragments, such as by grinding or other methods. In the preferred embodiment, the membrane fragments may be processed through the same apparatuses that initially dried and carried out the breaking of the eggshell to separate the membrane and shell in the first place. As discussed above, these apparatuses may include, but are not limited to, a drum dryer, a pulverizer, and a centrifuge or other apparatus employing centrifugal force. As one of skill in the art will appreciate, other types of equipment, such as equipment other than those using centrifugal force, may be used at this step. Once the eggshell membrane has been dried, it may then be collected as a final product. As discussed above, eggshell membrane has a number of nutritional and pharmaceutical uses.

Figure 3:
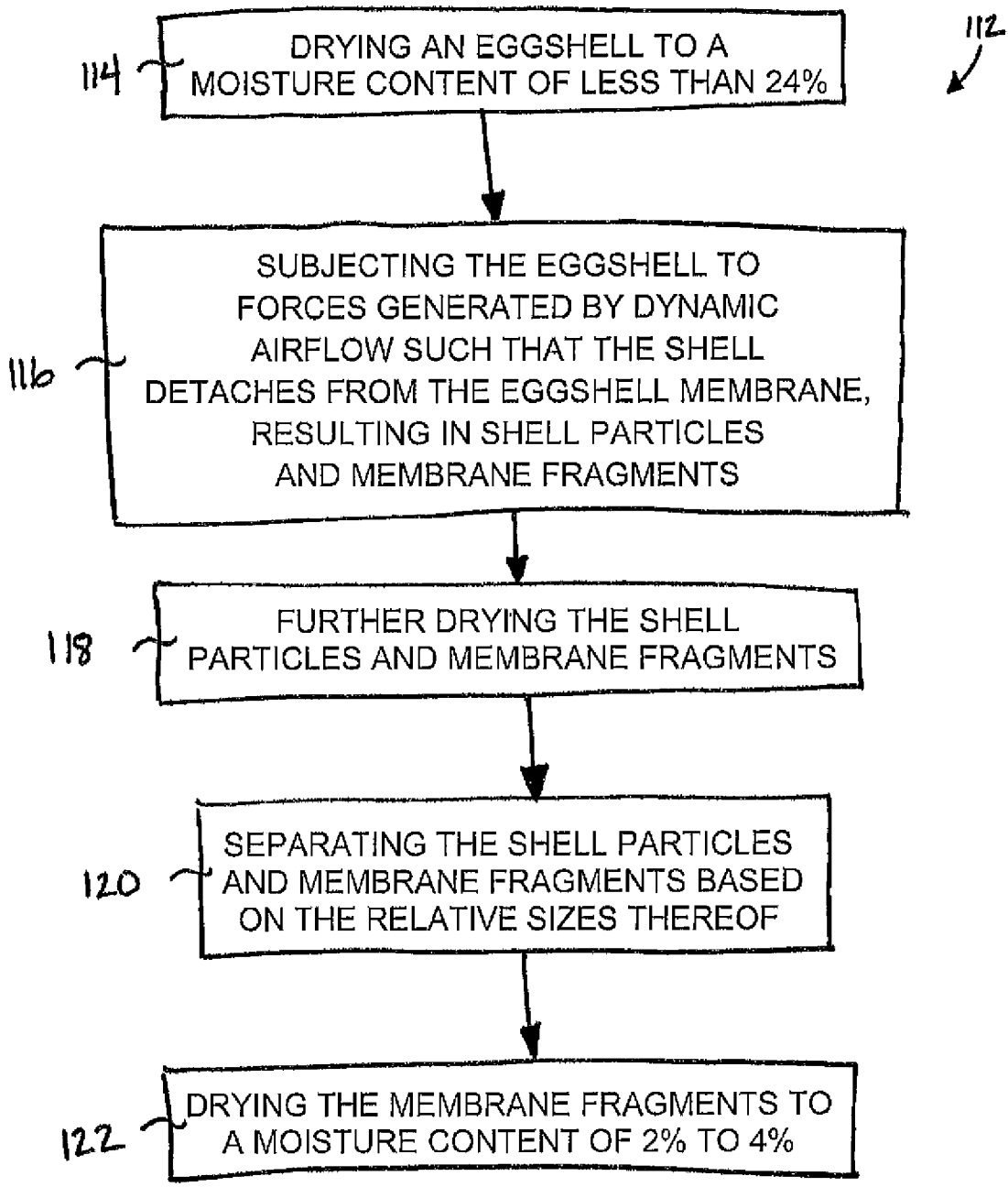
FIG. 3 is a flow chart of a second eggshell membrane separation process according to a second embodiment of a method of the present invention.

Referring to FIG. 3, a second method 112 of an eggshell membrane separation process is provided. As shown in block 114, the first step of the method is drying an eggshell to a moisture content of less than 24%. As discussed in further detail above, the moisture content of the eggshell in an eggshell membrane separation process affects the downstream recovery of the membrane. Accordingly, using eggshell raw product with optimum moisture content is preferable. In the preferred embodiment, the initial drying step 114 occurs at a temperature of 48-77 degrees Celsius (120-170 degrees Fahrenheit). More preferably the initial drying step occurs at a temperature of 60 degrees Celsius (140 degrees Fahrenheit). As will be apparent to one skilled in the art, a warmer dryer will oftentimes require less drying time to reach the appropriate moisture level, while a cooler dryer will oftentimes require more drying time to reach the appropriate moisture level.

As shown in block 116 of FIG. 3, after the eggshells have been dried to a moisture content of less than 24%, the next step of the second method 112 is subjecting the eggshell to forces generated by introducing an airflow, such as a dynamic airflow. The forces may include, but are not limited to, impacts, vibrations, centrifugal force, turbulent force, laminar stress, and combinations thereof The airflow breaks the shell such that the shell detaches from the membrane. The breaking produces shell particles and membrane fragments. The breaking step 116 may occur using many different types of equipment. For example, as discussed in further detail above, devices using non-contact types of force, such as a pulverizer, device utilizing airflow including or excluding a venturi, or centrifuge may be used to break the egg shells and detach same from the eggshell membrane. The breaking step results in shell particles and membrane fragments. Preferably, the shell particles may be a powder or dust. The membrane fragments may be any size sufficiently large enough to allow the shell particles and membrane fragments to be separated by a sifter or similar device. In the preferred embodiment, the membrane fragments may be greater than 5 mm. There is no maximum preferred size of the membrane fragments, although sizes nearing or above 1 cm are advantageous. Additionally, as discussed above, the airflow may reduce the moisture content of the eggshells 1% to 2% by weight.

Once the shell particles and membrane fragments have been produced in step 116, they are further dried, as shown in block 118 of FIG. 3. Moreover, the shell particles and membrane fragments are separated, as shown in block 120 of FIG. 3. In the preferred embodiment, the further drying 118 and separation 120 steps may occur simultaneously, such as via a Russell Finexe vibratory screener or similar device, such as a Gentle Roll™ sifter or Sweco stainless scalper/screener. However, one of skill in the art will appreciate that the two steps may be carried out in any number of ways, whether individually or simultaneously. As discussed above, one advantage of the described embodiment is that it further dries the shell particles and membrane fragments without the use of heat. The one or more screens of the vibratory screener or sifter should be sized to separate the egg shell particles and membrane fragments from each other, producing separate output streams of each. A consequence of the screening and/or sifting action is further drying of the shell particles and membrane fragments. Preferably, the membrane fragments exit the separation and further drying with 3% to 5% moisture by weight.

After drying and separation, the egg shell particles and membrane fragments may be individually processed for their ultimate applications. In the preferred embodiment, the egg shell particles are a powder or dust, which are transported via auger to a storage container. From there the particles may be bagged or otherwise collected and/or transported. As shown by block 122 of FIG. 3, the membrane fragments are dried after separation to a moisture content of 2% to 4%. In the preferred embodiment, the membrane fragments are dried in a drum dryer. However, the membrane fragments may be dried using any process known in the art, now or in the future. Moreover, in some embodiments, the membrane may be ground after separation. In the preferred embodiment, the membrane fragments may be subjected to the same apparatus that initially broke the eggshells such that the shell detached from the membrane, resulting in the shell particles and membrane fragments. As discussed above, examples of apparatuses may include pulverizers and centrifuges or other devices that utilize centrifugal force. Drying the membrane fragments removes any remaining water that may facilitate bacterial or other pathogenic growth. Moreover, in some embodiments, the membrane fragments may be ground and/or frozen after separation for storage and/or transport for the final membrane application.

Figure 4:
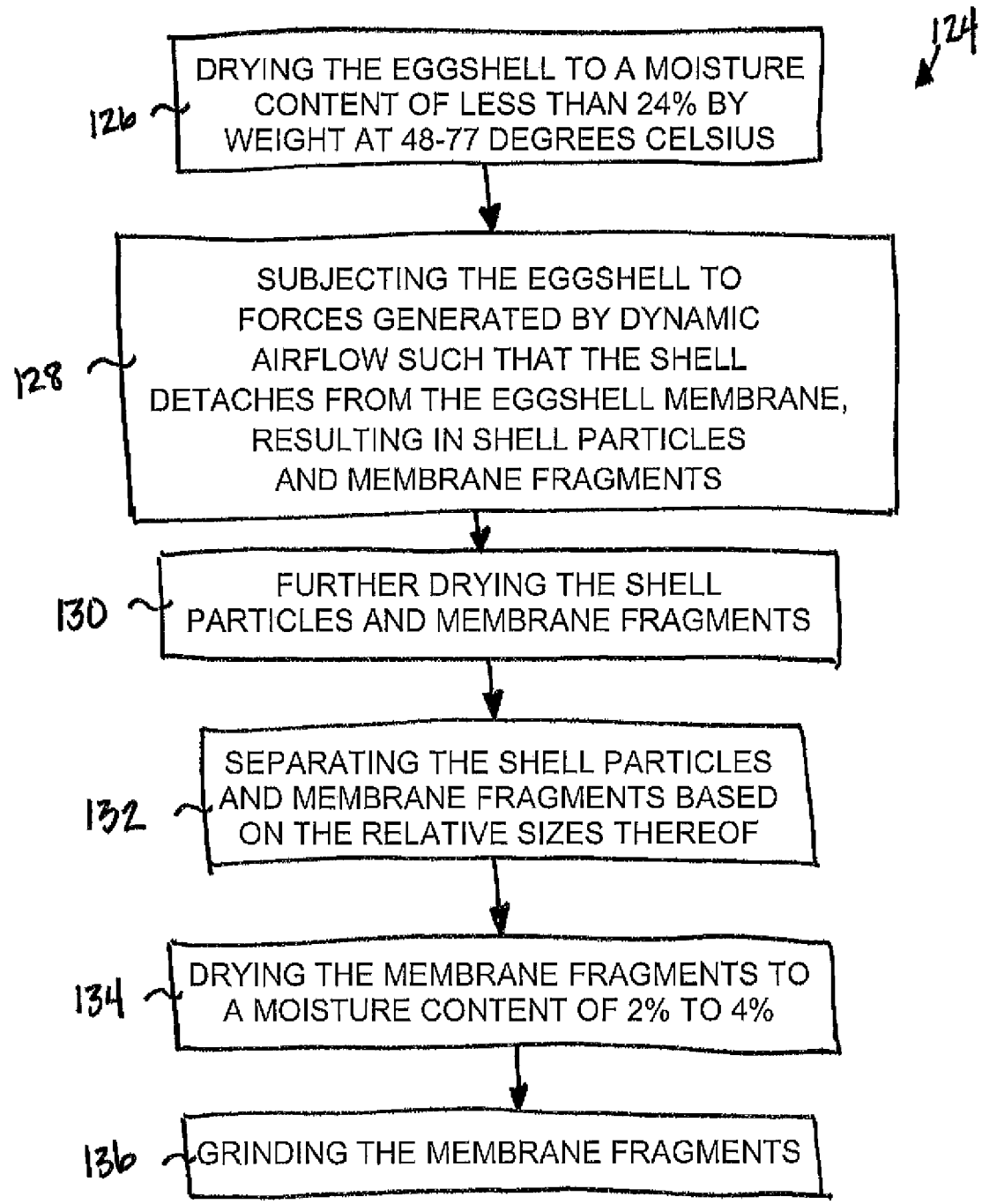
FIG. 4 is a flow chart of a third eggshell membrane separation process according to a third embodiment of a method of the present invention.

A third method 124 of eggshell membrane separation is illustrated in FIG. 4. The first step, as illustrated by block 126 includes drying an eggshell, including a shell and a membrane, to a moisture content of less than 24% by weight at 48-77 degrees Celsius. As discussed above, although the moisture content of the eggshell affects the amount of eggshell membrane ultimately recovered, the drying may take place in any type of drying device known in the art now or in the future. As illustrated by block 128, once the eggshells are dried, they are subjected to forces generated by dynamic airflow, which causes the shell to break and detach from the membrane. The forces may include, but are not limited to, impacts, vibrations, centrifugal force, turbulent force, laminar stress, and combinations thereof. This results in shell particles and membrane fragments. The shell particles are smaller in size than the membrane fragments and are preferably less than 50 microns in size. The airflow may reduce the moisture content of the eggshells by 1% to 2%.

Next, the shell particles and membrane fragments are further dried, as shown by block 130. The drying may take place in any suitable dryer known in the art, now or in the future. Moreover, illustrated in block 132, the shell particles and membrane fragments are separated. The separation occurs based on the relative sizes of the particles and fragments. In the preferred embodiment, drying 130 and separation 132 steps occur simultaneously, such as in a Russell Finexe brand vibratory sifter or a similar apparatus, such as a Gentle Roll™ or Sweco brand sifter. In the preferred embodiment a screen may be sized around 50 microns, correlating to the achieved maximum size of the shell particles. Accordingly, the shell particles fall through the screen, while the membrane fragments remain or exit via a different screen. In addition, the sifting action provides a method of further drying the shell particles and membrane fragments without adding additional heat. In the preferred embodiment, the membrane fragments include 3% to 5% moisture by weight after the further drying step.

Once the membrane fragments have been separated from the shell particles, the membrane fragments are dried to a moisture content of 2% to 4% by weight, as shown by block 134 of FIG. 4. Drying the membrane fragments may take place in any device or by any method known in the art now or in the future. In the preferred embodiment, the drying takes place in a drum dryer, such as those described above. Drying the membrane fragments may remove any excess or remaining water that may be located in or on the membrane. Because excess water may lead to bacterial or other pathogenic growth, this step prepares the membrane for storage, transport, and downstream applications. As one of skill in the art will appreciate final moisture contents other than 2% to 4% may be advantageous in certain applications. After the membrane fragments have been dried, the membrane fragments may be further reduced in size, such as by grinding, which is illustrated in block 136 of FIG. 4. Reducing the membrane fragments in size may take place by any device or method known in the art, now or in the future. In the preferred embodiment, the membrane fragments are ground by the same apparatus producing an airflow that initially pulverized the eggshell, resulting in the shell particles and membrane fragments. The ground membrane fragments are then collected for storage and/or transport for their final application. Additionally, the membrane fragments may be further dried, frozen, or otherwise preserved at any step after separation for transport and/or further processing.

Figure 5:
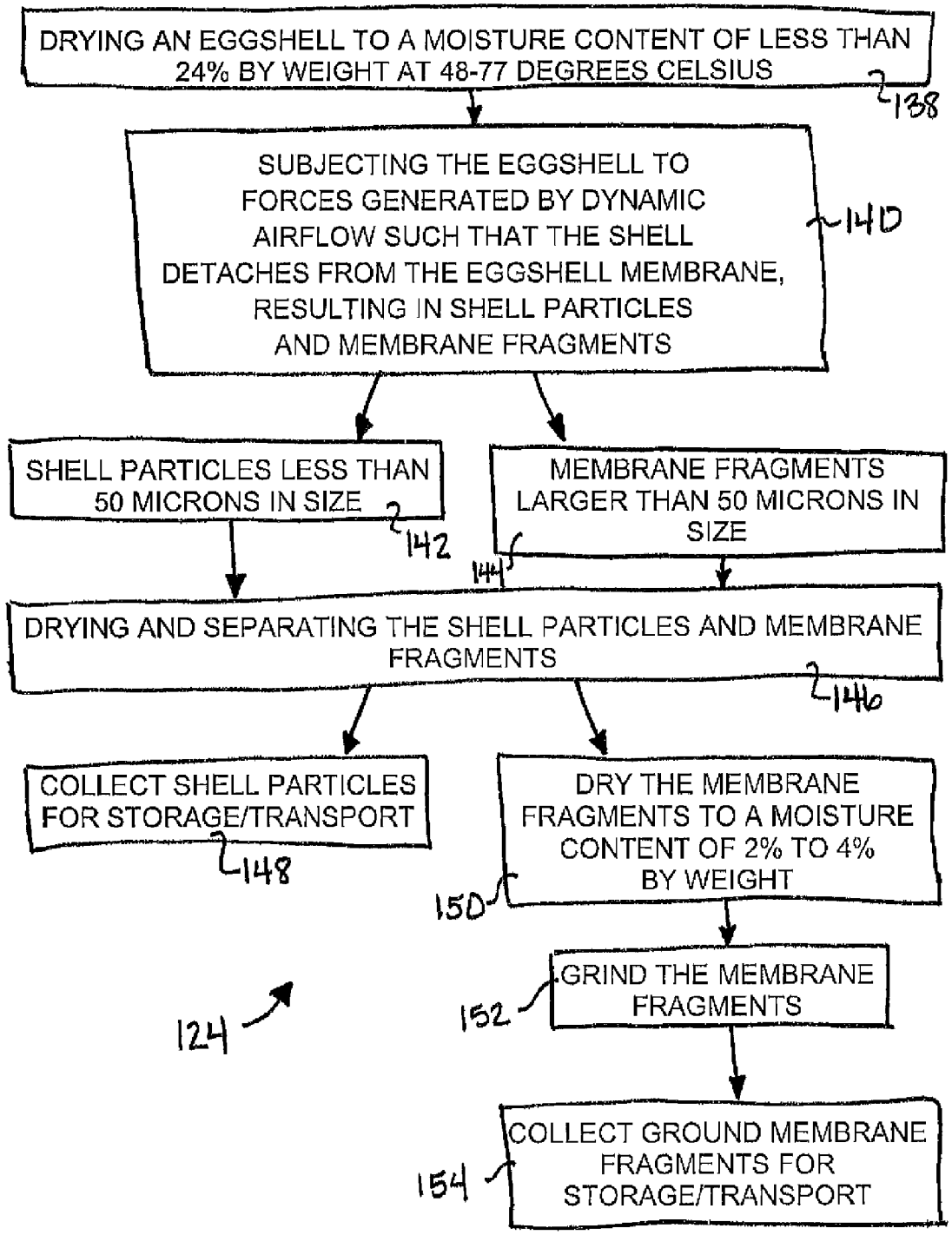
FIG. 5 is a flow chart of the third eggshell membrane separation process according to the third embodiment of a method of the present invention illustrated in FIG. 4.

FIG. 5 presents a second flow chart of the third method 124 for an eggshell membrane separation process of the present invention wherein the separate processing of the shell particles and membrane fragments is further illustrated. As shown by block 138, the method begins by drying an eggshell to a moisture content of less than 24% by weight at a temperature of 48-77 degrees Celsius. Then, the dried eggshell is subjected to an airflow, which breaks the shell such that the shell detaches from the membrane, as shown by block 140. This step results in two products, shell particles less than 50 microns in size 142 and membrane fragments larger than 50 microns in size 144. As discussed above, the difference in size is exploited during the separation process. These products may have 1% to 2% less moisture by weight than the eggshells after the eggshells are dried, but before subjecting same to airflow. Moreover, the initial moisture content of the eggshell, including the shell and membrane, prior to pulverization affects the size of the membrane fragments that result from pulverization. As shown by block 146, the shell particles and membrane fragments are then dried and separated from each other. As discussed above, this step may take place using a device employing a vibratory sifter. After separation, the shell particles are collected for storage and/or transport, which is illustrated by block 148 of FIG. 5. Preferably the shell particles will be a dust or powder. The separated membrane fragments, which preferably have a moisture content of 3% to 5% by weight, are dried to a moisture content of 2% to 4% by weight, as shown by block 150, and ground, as shown by block 152. As discussed in detail above, the drying 150 and grinding 152 steps may be carried out simultaneously. Next, shown by block 154, the ground membrane fragments are collected for storage and/or transport for their final applications.

Figure 6:
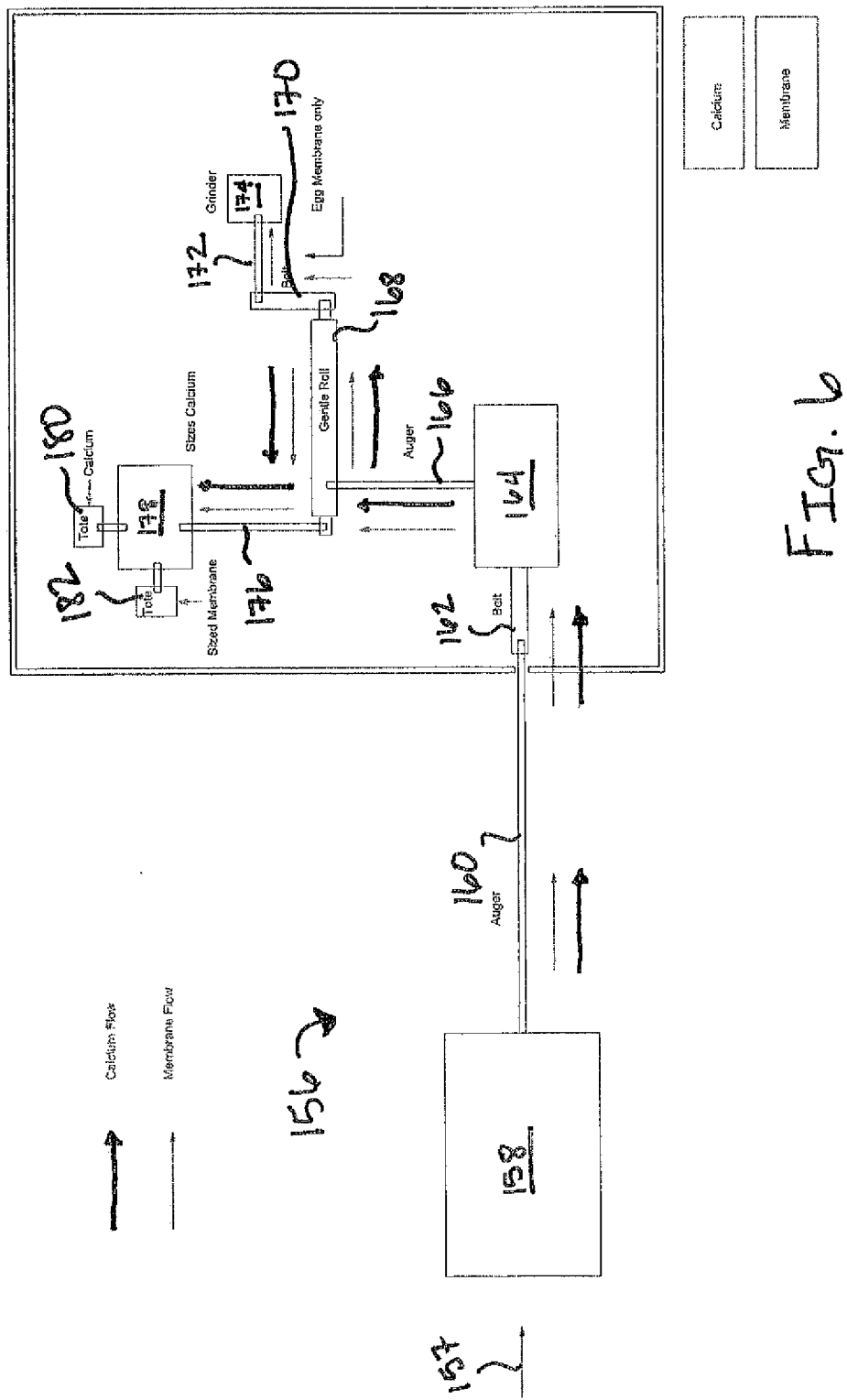
FIG. 6 is a schematic of one possible eggshell membrane separation facility for carrying out the above-referenced first, second, and third eggshell membrane separation processes of the present invention.

Turning now to FIG. 6, a schematic of an exemplary facility 156 for carrying out an eggshell membrane separation process is shown. Throughout FIG. 6, the path of the eggshell membrane is represented by a thin line, while the path of the shell is represented by a thick line. The beginning of the process begins with eggshell raw product 157 entering a dryer 158. As discussed above, the dryer 158 may be any type of device that operates to remove moisture from the eggshell raw product 157. In the preferred embodiment a drum dryer, which is kept at a fairly level position, is used. However, any type of device known now or in the future may be used. Next, the dried eggshells are transported via an auger 160 and belt 162 to a breaking apparatus 164, which uses non-contact force, such as airflow or ultrasonic grinding, to break the shell such that the shell detaches from the membrane. The breaking apparatus 164 may be any device that will break the shell causing the shell to detach from the eggshell membrane. As discussed above, the breaking and detachment results in shell particles and membrane fragments.

Next, the shell particles and membrane fragments are transported via an auger 166 to a sifting apparatus 168. As discussed above, the sifting apparatus 168 may be a vibratory screener, which works to both dry and separate the shell particles and membrane fragments. One such apparatus is a Russell Finex® brand vibratory sifter. Other sifting apparatuses 168 may include Gentle Roll™ brand sifters. In the described embodiment, the shell particles and membrane fragments are separated using a single screen, and in particular an 18 US mesh screen that allows sub 1000 micron egg shell calcium to fall away from the membrane may be used. In one example, approximately 95% of the membrane starting product remains above the screen, while 99.5% of the hard outer shell falls through during the separation step. As one of skill in the art will appreciate, multiple screens of the same or differing size may be used. The size, type, and number of screens will in many cases depend on the final use of the membrane product. At least a portion of the shell particles are sifted and separated from the membrane fragments. The separated shell particles are then transported via an auger 176 to a vertical sieve 178. Preferably the vertical sieve 178 is enclosed to collect dust therein because the shell particles are a fine powder or dust. After processing through the vertical sieve 178, the shell particles are collected in a tote 180 for storage and/or transport for the final application.

After separation by the sifting apparatus 168, the membrane fragments enter the start of the process again. In some scenarios, other foreign particles larger than the screen of the sifting apparatus 168 will be present with the membrane fragments. These foreign particles, which may include beaks and feathers, will continue through the process with the membrane fragments until such time as another separating process, such as sifting, occurs. The sifted membrane fragments and other foreign particles if present enter the drying apparatus 158 for drying. In one example, the membrane fragments exit the first pass through the facility with 18-20% moisture. At least a portion of this moisture is removed in the drying apparatus 158. In one example, the moisture content of the membrane fragments is reduced to 4%. This drying step may occur at approximately 71-83 degrees Celsius (160-180 degrees Fahrenheit). The dried membrane fragments are then transported via the auger 160 and belt 162 to the breaking apparatus 164. The membrane fragments are reduced in size, such as pulverized, by the breaking apparatus 164. From the breaking apparatus 164, the membrane fragments are transported via auger 166 to the sifting apparatus 168, which may further remove foreign particles such as feathers and beaks. At this time, the membrane may be bagged and stored. Alternatively, the membrane may be further processed. For example, after the sifting apparatus 168, the membrane may be transported via a series of belts 170, 172 to a grinding apparatus 174. The grinding apparatus 174 may further reduces the size of the membrane fragments. The membrane fragments are then transported to the vertical sieve 178 for collection in a tote 182. The membrane fragments may then be stored and/or transported for the final application. In another example, the membrane fragments or ground membrane may be frozen for future use.

It will be understood in the art that the above described facility 156 and machinery may be altered so as to effect the same eggshell membrane separation process. Accordingly, the above facility 156 is provided as an example only.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements, and/or substantial equivalents.

The invention claimed is:

1. A method comprising:
    adjusting the moisture content of an eggshell by subjecting said eggshell to heat at a temperature of 77 degrees Celsius or less, said eggshell comprising a shell and a membrane;
    subjecting said eggshell to forces generated by dynamic airflow, said dynamic airflow breaking said shell such that said shell detaches from said membrane, resulting in shell particles and membrane fragments.

2. The method of claim 1 wherein said forces are selected from the group consisting of impacts, vibrations, centrifugal force, turbulent force, laminar stress, and combinations thereof.

3. The method of claim 1 wherein the step of adjusting the moisture content of said eggshell results in eggshell with less than 24% moisture by weight.

4. The method of claim 3 wherein the step of adjusting the moisture content of said eggshell results in eggshell with 10-24% moisture by weight.

5. The method of claim 1 wherein the step of adjusting the moisture content of said eggshell occurs in a dryer having a temperature of 60 degrees Celsius.

6. The method of claim 1 wherein the step of adjusting the moisture content of said eggshell occurs for about 60 to 90 minutes.

7. The method of claim 1 further comprising drying said shell particles and said membrane fragments.

8. The method of claim 7 further comprising separating said shell particles from said membrane fragments.

9. The method of claim 8 further comprising processing said membrane fragments after separating said membrane fragments from said shell particles and wherein said processing includes at least one process selected from the group consisting of drying, freezing, and grinding.

10. The method of claim 8 wherein said shell is pulverized to particles smaller in size than said membrane fragments and separation is based on the relative sizes or densities of said shell particles and said membrane fragments.

11. The method of claim 1 wherein said shell particles are less than 50 microns.

12. The method of claim 1 wherein said adjusting said moisture content of an eggshell comprises drying said eggshell.

13. The method of claim 1 wherein an apparatus for subjecting said eggshell to said forces comprises stainless steel.

14. A method comprising:
    drying an eggshell utilizing heat at a temperature of 77 degrees Celsius or less, said eggshell comprising a shell and a membrane;
    subjecting said eggshell to airflow wherein said airflow breaks said shell such that said shell detaches from said membrane, resulting in shell particles and membrane fragments;
    said shell particles smaller in size than said membrane fragments;
    further drying said shell particles and said membrane fragments; and
    separating said shell particles from said membrane fragments based on the relative sizes of said shell particles and said membrane fragments.

15. The method of claim 14 wherein said eggshell is dried to a moisture content of less than 24% by weight.

16. The method of claim 14 wherein said drying of said eggshell occurs for about 60-90 minutes.

17. The method of claim 14 wherein the step of subjecting said eggshell to an airflow results in shell particles that are less than 50 microns in size.

18. A method comprising:
   drying an eggshell, said eggshell comprising a shell and a membrane, to a moisture content of less than 24% by weight;
   said drying occurring at a temperature of 48-77 degrees Celsius:
   subjecting said eggshell to airflow wherein said air flow breaks said shell such that said shell detaches from said membrane, resulting in shell particles and membrane fragments;
   said shell particles smaller in size than said membrane fragments;
   further drying said shell particles and said membrane fragments;
   separating said shell particles from said membrane fragments based on the relative sizes or densities of said shell particles and said membrane fragments;
   said membrane fragments having a moisture content of 3% to 5% after said further drying and said separating; and
   processing said membrane fragments;
   wherein said processing includes at least one process selected from the group consisting of drying, freezing, and grinding.

* * * * *